United States Patent
Kou et al.

(10) Patent No.: US 11,320,021 B2
(45) Date of Patent: May 3, 2022

(54) METHOD AND DEVICE FOR PREVENTING IMPACT VIBRATION OF LIFT SYSTEM

(71) Applicant: TAIYUAN UNIVERSITY OF TECHNOLOGY, Taiyuan (CN)

(72) Inventors: Ziming Kou, Taiyuan (CN); Juan Wu, Taiyuan (CN); Yujin Li, Taiyuan (CN); Jianwei Yang, Taiyuan (CN); Jing Zhang, Taiyuan (CN); Yufei Xue, Taiyuan (CN)

(73) Assignee: TAIYUAN UNIVERSITY OF TECHNOLOGY, Taiyuan (CN)

( * ) Notice: Subject to any disclaimer, the term of this patent is extended or adjusted under 35 U.S.C. 154(b) by 563 days.

(21) Appl. No.: 16/324,905

(22) PCT Filed: Dec. 8, 2016

(86) PCT No.: PCT/CN2016/109071
§ 371 (c)(1),
(2) Date: Feb. 11, 2019

(87) PCT Pub. No.: WO2018/103048
PCT Pub. Date: Jun. 14, 2018

(65) Prior Publication Data
US 2021/0285513 A1    Sep. 16, 2021

(51) Int. Cl.
  *F16F 15/00* (2006.01)
  *B66D 1/54* (2006.01)
  *G05B 13/04* (2006.01)
(52) U.S. Cl.
  CPC ............. *F16F 15/002* (2013.01); *B66D 1/54* (2013.01); *G05B 13/042* (2013.01); *F16F 2230/18* (2013.01)

(58) Field of Classification Search
  CPC ............................. B66D 1/54; F16F 2230/18
  (Continued)

(56) References Cited

U.S. PATENT DOCUMENTS 9,038,782 B2 * 5/2015 Blanchard ................. B66B 7/08
                                                   187/411
10,005,641 B2 * 6/2018 Smith ..................... F16F 7/104
(Continued)

FOREIGN PATENT DOCUMENTS

| CN | 103303798 A | 9/2013 |
| CN | 103482475 A | 1/2014 |

(Continued)

OTHER PUBLICATIONS

First Office Action of Chinese application No. 201611243210.9, dated Aug. 28, 2018.
(Continued)

*Primary Examiner* — Md Azad
(74) *Attorney, Agent, or Firm* — Syncoda LLC; Feng Ma (57) ABSTRACT

A method and device for preventing impact vibration of a lift system include: acquiring a load weight in a lift container; obtaining preset basic parameters of a lift system; according to the load weight in the lift container and the basic parameters of the lift system, determining a fundamental wave vibration period of a lifting rope when the lift system starts; according to the fundamental wave vibration period and preset calculation parameters of the lift system, determining time-varying simulation parameters of an acceleration of the lift system during a lifting process; according to determined time-varying simulation parameters of the acceleration, lifting the lift container.

9 Claims, 5 Drawing Sheets

(58) Field of Classification Search
USPC .......................................................... 700/280
See application file for complete search history.

(56) References Cited

U.S. PATENT DOCUMENTS

| | | | | |
|---|---|---|---|---|
| 2009/0266650 | A1* | 10/2009 | Utsunomiya | B66B 11/028 187/391 |
| 2010/0230370 | A1* | 9/2010 | Schneider | B66C 23/52 212/276 |
| 2012/0004777 | A1* | 1/2012 | Wang | B66B 7/042 700/280 |
| 2013/0018639 | A1* | 1/2013 | Sakai | B66B 1/285 703/2 |
| 2013/0213919 | A1 | 8/2013 | Kyllingstad | |
| 2013/0245815 | A1 | 9/2013 | Nenzing | |
| 2014/0224755 | A1* | 8/2014 | Eriksson | B66C 13/06 212/273 |
| 2016/0194183 | A1* | 7/2016 | Kyllingstad | B66C 13/066 212/272 |

FOREIGN PATENT DOCUMENTS

| | | |
|---|---|---|
| CN | 204847871 U | 12/2015 |
| CN | 105366549 A | 3/2016 |
| CN | 106815472 A | 6/2017 |
| JP | 2009012932 A | 1/2009 |
| JP | 2010030728 A | 2/2010 |
| JP | 2010-270812 A | 12/2010 |
| TW | 201000385 A | 1/2010 |

OTHER PUBLICATIONS

English translation of the Written Opinion of the International Search Authority in the international application No. PCT/CN2016/109071, dated Sep. 6, 2017.
Second Office Action of Australia application No. 2016431712, dated Dec. 5, 2019.
International Search Report in international application No. PCT/CN2016/109071, dated Sep. 6, 2017.
(Hoisting and Conveying Machinery), non-official translation (Li, Yujin,"Elastic Vibration Theory and Dynamics Characteristic Analysis of Lifting Rope of Elevator") Apr. 30, 2003 7-13 (Apr. 30, 2003), No. 4. pages 32-36.

* cited by examiner

METHOD AND DEVICE FOR PREVENTING IMPACT VIBRATION OF LIFT SYSTEM

TECHNICAL FIELD

The disclosure relates to a hoisting system, and particularly to a method and device for preventing impact vibration of a hoisting system.

BACKGROUND

According to an existing starting method for a large hoisting system, in a process of restarting hoisting after reloading objects in a hoisting container of the hoisting system, a fixed time-varying simulation parameter of acceleration is usually set to hoist the hoisting container. Under such a circumstance, it is impossible to timely regulate the time-varying simulation parameter of the acceleration according to a change of a weight parameter when the quantity of loads added in the hoisting container is changed, and the hoisting system may generate impact vibration.

Therefore, great adverse impact may be brought to the hoisting system and a power transmission device thereof, equipment may even be damaged, and production safety is threatened.

SUMMARY

For the technical problem of an existing starting method for a hoisting system, the disclosure provides a method for preventing impact vibration of a hoisting system, so as to effectively prevent damage caused by impact vibration to the hoisting system and a power transmission device thereof due to the fact that a time-varying simulation parameter of acceleration may not be timely regulated when weight of a load changes, and further prolong service life of the hoisting system.

The disclosure provides a method for preventing impact vibration of a hoisting system, which includes that: a load weight in a hoisting container is acquired; a preset hoisting system basic parameter is acquired; a fundamental wave vibration period of hoisting ropes when the hoisting system is started is determined according to the load weight in the hoisting container and the preset hoisting system basic parameter; a preset hoisting system calculation parameter is acquired; a time-varying simulation parameter of acceleration of the hoisting system in a process of hoisting is determined according to the fundamental wave vibration period and the preset hoisting system calculation parameter; and the hoisting container is hoisted according to the determined time-varying simulation parameter of the acceleration.

As an implementation mode, the preset hoisting system basic parameter includes: self-weight of the hoisting container, an expected hoisting height of the hoisting system, the number of the hoisting ropes, linear mass of the hoisting ropes, an elastic modulus of the hoisting ropes and a sectional area of the hoisting ropes.

As an implementation mode, the preset hoisting system calculation parameter includes: an expected hoisting speed of the hoisting system, a ratio $N=t_1/T_{j1}$ of a time length of initial variable acceleration to the fundamental wave vibration period and a ratio $K_N$ of a total time length of starting acceleration to the fundamental wave vibration period.

As an implementation mode, the ratio $N$ of the time length of the initial variable acceleration to the fundamental wave vibration period and the ratio $K_N$ of the total time length of starting acceleration to the fundamental wave vibration period are as follows: $N=20$ and $K_N=1$.

As an implementation mode, the operation that the fundamental wave vibration period of the hoisting ropes when the hoisting system is started is determined through the acquired load weight in the hoisting container and the preset hoisting system basic parameter is implemented as follows:

a ratio $\beta_1$ of self-weight of the ropes to a total load weight carried by the hoisting ropes is calculated according to a formula $$\beta_1 = \frac{N_1 P_K h}{m_1 + m_2},$$

where $N_1$ is the number of the hoisting ropes, $P_K$ is the linear mass of the hoisting ropes, h is the expected hoisting height of the hoisting system, $m_1$ is the self-weight of the hoisting container, and $m_2$ is the load weight in the hoisting container;

a fundamental wave vibration frequency $\omega_1$ when the hoisting system is started is calculated according to a formula $$\omega_1 = \frac{j\lambda_1}{h},$$

where $\lambda_1$ is a solution of an equation $\lambda_1 \tan \lambda_1 = \beta_1$ related to $\beta_1$, h is the expected hoisting height of the hoisting system, j is an elastic wave propagation speed of the hoisting ropes, and a calculation formula for j is:

$$j = \sqrt{\frac{EA}{P_k}},$$

where E is the elastic modulus of the hoisting ropes, A is the sectional area of the hoisting ropes, and $P_K$ is the linear mass of the hoisting ropes; and the fundamental wave vibration period $T_{j1}$ is calculated according to a formula $$T_{j1} = \frac{2\pi}{\omega_1}.$$

As an implementation mode, the operation that the time-varying simulation parameter of the acceleration of the hoisting system is determined through the fundamental wave vibration period and the preset hoisting system calculation parameter is implemented as follows:

calculation formulas for the time-varying simulation parameter of the acceleration is determined according to a setting to be:

$$a(t) = \begin{cases} \dfrac{v}{T} \dfrac{N}{N-K_N} \dfrac{t}{t_1} & (0 \le t \le t_1) \\ \dfrac{v}{T} \dfrac{N}{N-K_N} & (t_1 \le t \le t_2) \\ \dfrac{v}{T} \dfrac{N}{N-K_N}\left(1 - \dfrac{t-t_2}{T-t_2}\right) & (t_2 \le t \le T) \end{cases}$$

-continued and $$v(t) = \begin{cases} \dfrac{v}{T} \dfrac{N}{N-K_N} \dfrac{t^2}{2t_1} & (0 \le t \le t_1) \\ \dfrac{v}{T} \dfrac{N}{N-K_N} \left(\dfrac{t_1}{2}+t-t_1\right) & (t_1 \le t \le t_2) \\ 1 - \dfrac{v}{T} \dfrac{N}{N-K_N} \dfrac{(T-t)^2}{(T-t_2)} & (t_2 \le t \le T) \end{cases}$$

and the time-varying simulation parameter of the acceleration is determined according to the calculation formulas and the determined ratio N of the time length of the initial variable acceleration to the fundamental wave vibration period, ratio $K_N$ of the total time length of starting acceleration to the fundamental wave vibration period, fundamental wave vibration period $T_{j1}$ and expected hoisting speed v of the hoisting system, where v is the expected hoisting speed of the hoisting system, $[0,t_1]$ is a time interval of initial variable acceleration, $[t_2,T]$ is a time interval of last variable acceleration, $[t_1,t_2]$ is a time interval during which the acceleration is constant, T is the total time length of starting acceleration during which a speed of the hoisting system reaches the expected hoisting speed v from 0, and $t_1=T-t_2=K_N T/N$, that is, the time length of the initial variable acceleration is equal to the time length of the last variable acceleration, the ratio $K_N$ of the total time length of starting acceleration to the fundamental wave vibration period is a real number greater than 0, and a ratio $N=t_1/T_{j1}$ of the time length of the initial variable acceleration to the fundamental wave vibration period is a positive integer greater than 0.

The disclosure further provides a device for preventing impact vibration of a hoisting system, which includes: a weighing unit and a control unit, wherein the weighing unit is configured to detect load weight in a hoisting container, and transmit data about the detected load weight in the hoisting container to the control unit; and the control unit is configured to determine a fundamental wave vibration period of hoisting ropes when the hoisting system is started according to the load weight in the hoisting container and a preset hoisting system basic parameter, determine a time-varying simulation parameter of acceleration of the hoisting system according to the fundamental wave vibration period and a preset hoisting system calculation parameter, and control a power transmission device of the hoisting system to hoist the hoisting container according to the determined time-varying simulation parameter of the acceleration.

Compared with an existing starting control method for the hoisting system, the disclosure, when the hoisting system is started, may acquire the load weight in the hoisting container, determine the fundamental wave vibration period of the hoisting ropes when the hoisting system is started according to the acquired load weight in the hoisting container and the preset hoisting system basic parameter in the control unit, and further determine the time-varying simulation parameter of the acceleration of the hoisting system according to the fundamental wave vibration period and the preset hoisting system calculation parameter, that is, a proper control method may be determined according to different parameters during starting of each time. In such a manner, damage caused by impact vibration to the hoisting system and the power transmission device thereof due to the fact that the time-varying simulation parameter of the acceleration may not be timely regulated when the load weight changes may be better prevented, so that service life of the hoisting system is prolonged.

DETAILED DESCRIPTION

The disclosure will further be described below in combination with the drawings in detail.

Figure 1:
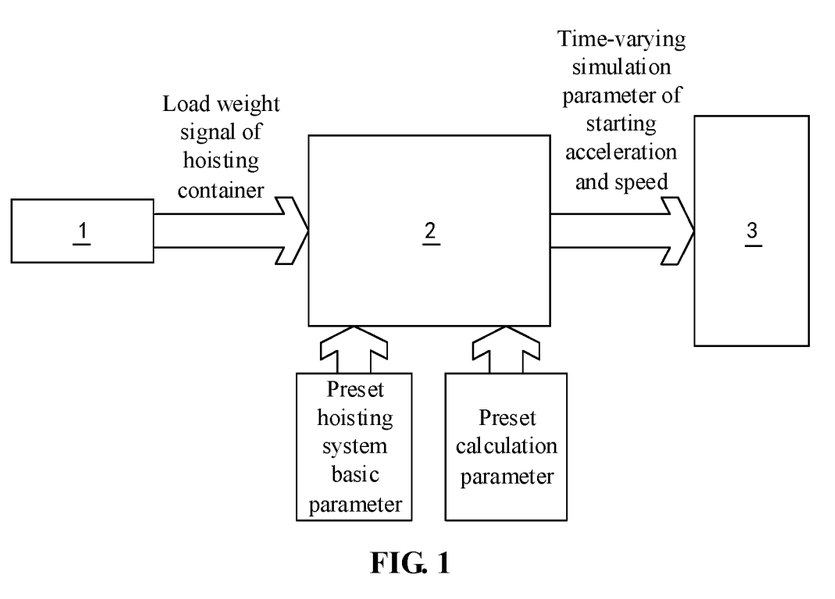
FIG. 1 is a schematic diagram of preventing impact vibration of a hoisting system according to an embodiment of the disclosure.
Figure 4:
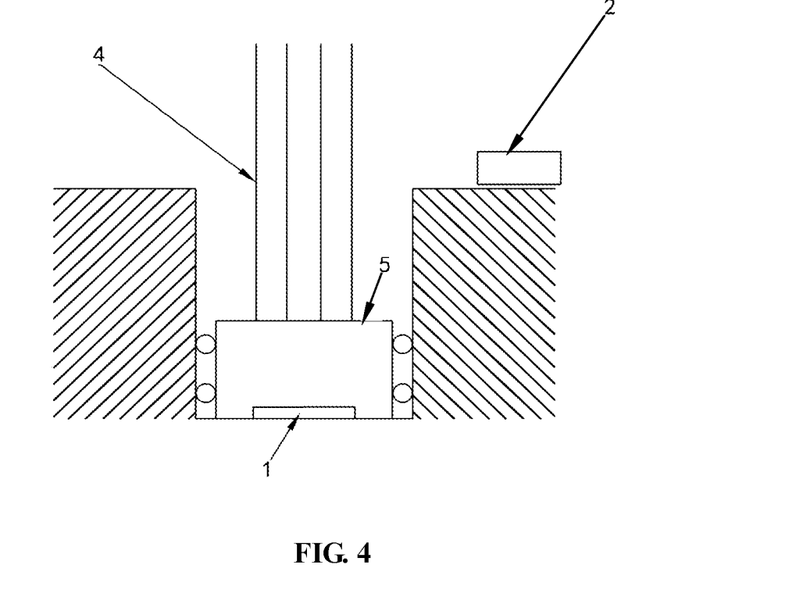
FIG. 4 is a schematic diagram of a device for preventing impact vibration of a hoisting system according to an embodiment of the disclosure.
Figure 5:
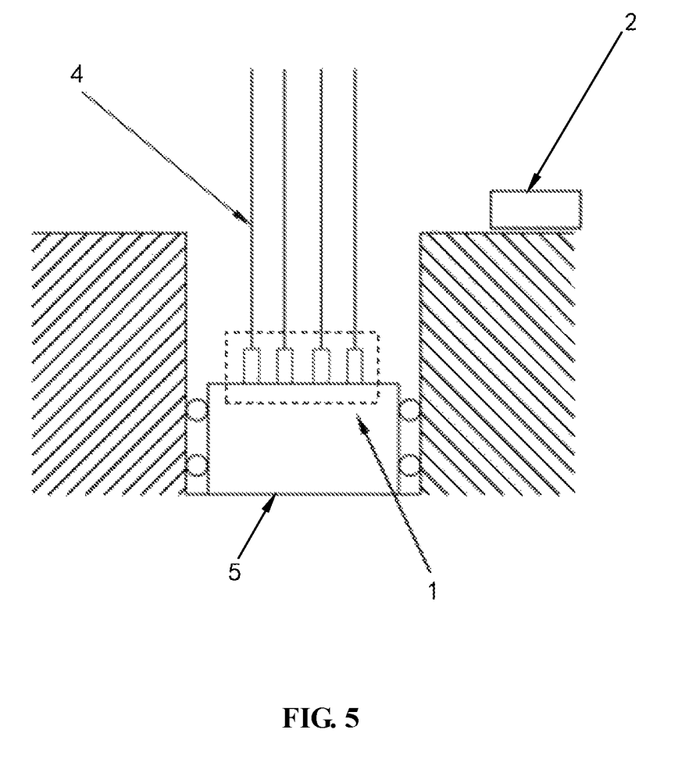
FIG. 5 is a schematic diagram of a device for preventing impact vibration of a hoisting system according to another embodiment of the disclosure.

FIG. 1 is a schematic diagram of preventing impact vibration of a hoisting system according to an embodiment of the disclosure. Wherein, a weighing unit 1 is configured to detect and determine current load weight of a hoisting container 5 which is shown in FIG. 4 and FIG. 5, and its output end is connected with an input end of a control unit 2. An output end of the control unit 2 is connected with an input end of a power transmission device 3, and the control unit 2 implements control over an input signal of the power transmission device 3 to further implement control over the hoisting system. As shown in a device for preventing impact vibration of the hoisting system in FIG. 4 or FIG. 5, every time when the load weight in the hoisting container 5 changes, the weighing unit 1 in FIG. 4 or FIG. 5 reads the current load weight in the hoisting container 5, and sends data about the load weight to the control unit 2. The control unit 2 determines a time-varying simulation parameter of acceleration according to the load weight in the hoisting container 5, a preset hoisting system basic parameter and a preset hoisting system calculation parameter, and inputs a control signal obtained according to the determined time-varying simulation parameter of the acceleration to the power transmission device 3.

The control unit 2 determines the time-varying simulation parameter of the acceleration by the following calculation method: first, a fundamental wave vibration period of hoisting ropes 4 connected with the hoisting container 5 when the hoisting system is started is determined according to the load weight sent by the weighing unit 1 and the preset hoisting system basic parameter, wherein the preset hoisting system basic parameter includes: self-weight of the hoisting container 5, an expected hoisting height of the hoisting system, the number of the hoisting ropes 4, a linear mass of the hoisting ropes 4, an elastic modulus of the hoisting ropes 4 and a sectional area of the hoisting ropes 4; and then, the time-varying simulation parameter of the acceleration of the hoisting system is determined according to the fundamental wave vibration period and the preset hoisting system calculation parameter, wherein the preset hoisting system calculation parameter includes: an expected hoisting speed of the hoisting system, a ratio N of a time length of initial variable acceleration to the fundamental wave vibration period and a ratio $K_N$ of a total time length of starting acceleration to the fundamental wave vibration period, wherein the ratio N of the time length of the initial variable acceleration to the fundamental wave vibration period and the ratio $K_N$ of the total time length of starting the acceleration to the fundamental wave vibration period are both specific numerical values obtained according to a hoisting system impact restriction theory.

According to the above calculation method, when the load weight in the hoisting container 5 is determined, a time-varying simulation parameter suitable for the acceleration of the hoisting system this time may be timely determined, so that damage, caused by impact vibration to the hoisting system and the power transmission device 3 thereof due to the fact that the time-varying simulation parameter of the acceleration may not be timely regulated when the load weight changes during each time starting the hoisting system, may be prevented.

Figure 2:
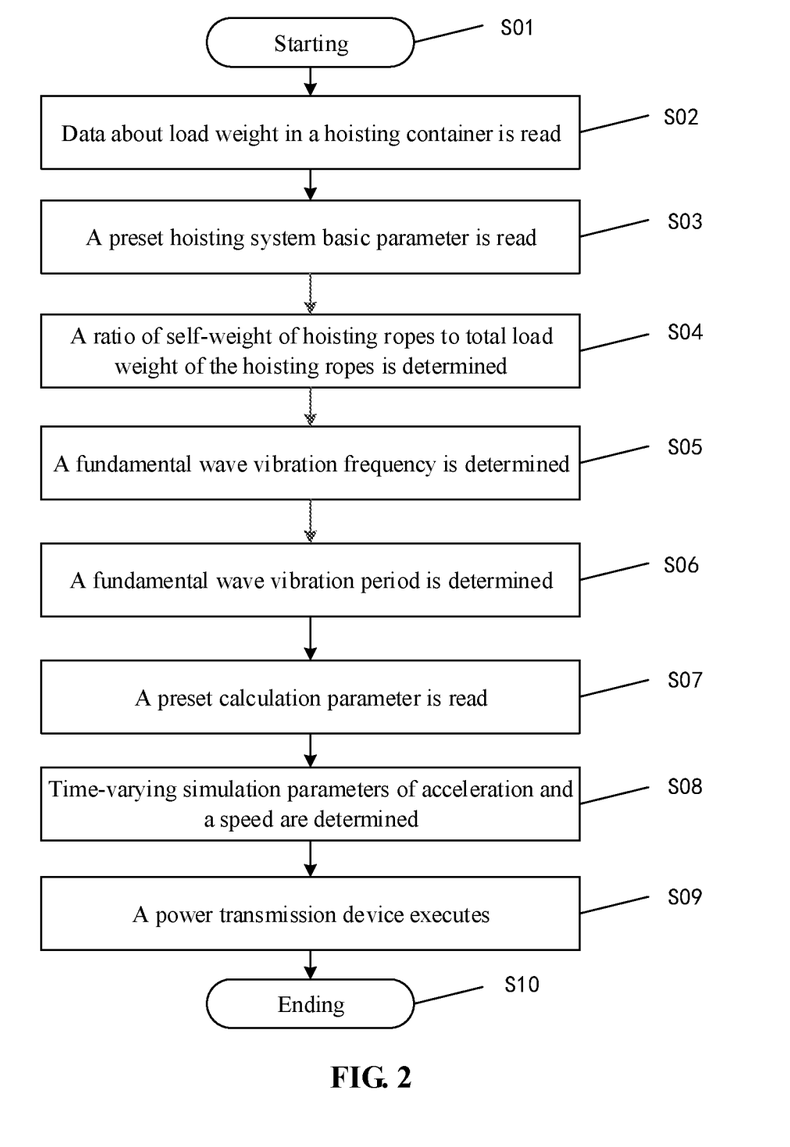
FIG. 2 is a flowchart of a method for preventing impact vibration of a hoisting system according to an embodiment of the disclosure.

FIG. 2 is a flowchart of a method for preventing impact vibration of a hoisting system according to an embodiment of the disclosure. As shown in FIG. 2, the method for preventing impact vibration of the hoisting system in the embodiment of the disclosure includes the following steps.

In Step S01, the method is started.

In Step S02, data about load weight in a hoisting container 5 is read, and the data is acquired and transmitted to a control unit 2 through a weighing unit 1.

In Step S03, a preset hoisting system basic parameter is read, the read preset hoisting system basic parameter including: self-weight of the hoisting container 5, an expected hoisting height of the hoisting system, the number of hoisting ropes 4, a linear mass of the hoisting ropes 4, an elastic modulus of the hoisting ropes 4 and a sectional area of the hoisting ropes 4.

In Step S04, a ratio of self-weight of the hoisting ropes 4 to total load weight currently carried by the hoisting ropes 4 is determined, a specific algorithm being as follows:

the ratio $\beta_1$ of the self-weight of the hoisting ropes 4 to the total load weight currently carried by the hoisting ropes 4 is calculated according to the following formula, i.e.:

$$\beta_1 = \frac{N_1 P_K h}{m_1 + m_2},$$

where $N_1$ is the number of the hoisting ropes 4, $P_K$ is the linear mass of the hoisting ropes 4, h is the expected hoisting height of the hoisting system, $m_1$ is the self-weight of the hoisting container 5, and $m_2$ is the load weight in the hoisting container 5.

In Step S05, a fundamental wave vibration frequency of the hoisting ropes 4 when the hoisting system is started is determined, a specific algorithm being as follows:

the fundamental wave vibration frequency $\omega_1$ of the hoisting ropes 4 is calculated according to the following formula, i.e.:

$$\omega_1 = \frac{j\lambda_1}{h},$$

where $\lambda_1$ is a solution of an equation $\lambda_1 \tan \lambda_1 = \beta_1$ related to $\beta_1$, h is the expected hoisting height of the hoisting system, and j is an elastic wave propagation speed of the hoisting ropes, wherein a calculation formula for the elastic wave propagation speed j is:

$$j = \sqrt{\frac{EA}{P_K}},$$

where E is the elastic modulus of the hoisting ropes 4, A is the sectional area of the hoisting ropes 4, and $P_K$ is the linear mass of the hoisting ropes.

In Step S06, a fundamental wave vibration period when the hoisting system is determined, a specific algorithm being as follows:

the fundamental wave vibration period $T_{j1}$ is calculated according to the following formula, i.e.:

$$T_{j1} = \frac{2\pi}{\omega_1},$$

where $\omega_1$ is the fundamental wave vibration frequency.

In Step S07, a preset hoisting system calculation parameter is acquired, wherein the calculation parameter includes: an expected hoisting speed of the hoisting system, a ratio N of a time length of initial variable acceleration to the fundamental wave vibration period and a ratio $K_N$ of a total time length of starting acceleration to the fundamental wave vibration period.

In Step S08, a time-varying simulation parameter of acceleration is determined, a specific algorithm being as follows.

Figure 3:
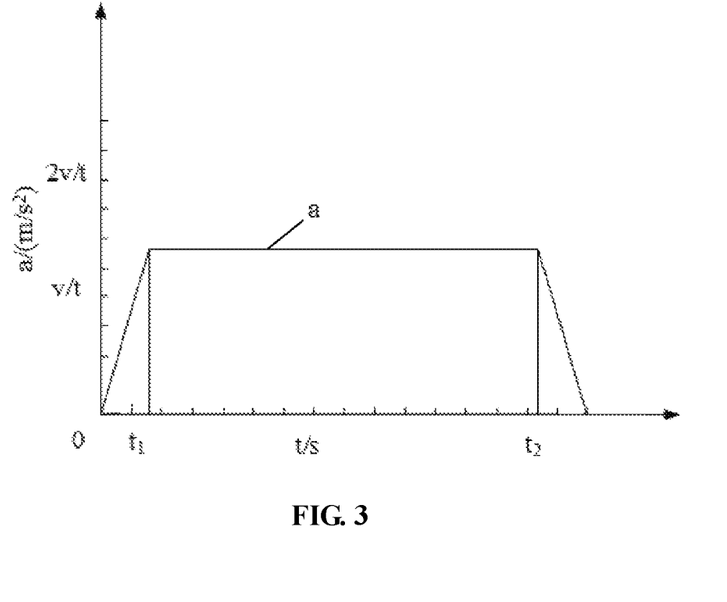
FIG. 3 is a curve diagram of a time-varying simulation parameter of acceleration according to an embodiment of the disclosure.

FIG. 3 is a curve diagram of a time-varying simulation parameter of acceleration according to an embodiment of the disclosure. As shown in FIG. 3, the time-varying simulation parameter is a starting time-varying simulation parameter common for the hoisting system. In the time-varying simulation parameter in FIG. 3, v is the expected hoisting speed the hoisting system is expected to reach, $[0, t_1]$ is a time interval of the initial variable acceleration, $[t_2, T]$ is a time interval of last variable acceleration, $[t_1, t_2]$ is a time interval during which the acceleration is constant, T is the total time length of starting the acceleration during which a speed of the hoisting system reaches the expected hoisting speed v from 0, and $t_1 = T - t_2 = K_N T/N$, that is, the time length of the initial variable acceleration is equal to the time length of the last variable acceleration, $K_N$ is the ratio of the total time length of starting the acceleration to the fundamental wave vibration period, the ratio is a real number greater than 0, N is the ratio of the time length of the initial variable acceleration to the fundamental wave vibration period, that is, $N = t_1/T_{j1}$, and the ratio is a positive integer greater than 0.

According to an acceleration curve shown in FIG. 3, calculation formulas for the time-varying simulation parameter of the acceleration may be determined according to such a setting, i.e. the following formulas:

$$a(t) = \begin{cases} \dfrac{v}{T} \dfrac{N}{N - K_N} \dfrac{t}{t_1} & (0 \leq t \leq t_1) \\ \dfrac{v}{T} \dfrac{N}{N - K_N} & (t_1 \leq t \leq t_2) \\ \dfrac{v}{T} \dfrac{N}{N - K_N} \left(1 - \dfrac{t - t_2}{T - t_2}\right) & (t_2 \leq t \leq T) \end{cases}$$

$$v(t) = \begin{cases} \dfrac{v}{T}\dfrac{N}{N-K_N}\dfrac{t^2}{2t_1} & (0 \leq t \leq t_1) \\ \dfrac{v}{T}\dfrac{N}{N-K_N}\left(\dfrac{t_1}{2}+t-t_1\right) & (t_1 \leq t \leq t_2) \\ 1-\dfrac{v}{T}\dfrac{N}{N-K_N}\dfrac{(T-t)^2}{2(T-t_2^2)} & (t_2 \leq t \leq T) \end{cases}$$

Therefore, the time-varying simulation parameter of the acceleration when the hoisting system is started may be determined according to the calculation formulas, the determined ratio N of the time length of the initial variable acceleration to the fundamental wave vibration period and ratio $K_N$ of the total time length of starting the acceleration to the fundamental wave vibration period (during specific calculation, N=20 and $K_N$=1), the fundamental wave vibration period $T_{j1}$ determined in Step S06 and the expected hoisting speed v the hoisting system is executed to reach in the preset hoisting system calculation parameter. A practical time-varying simulation parameter of the acceleration may also refer to FIG. 3, and the only difference is that, when it is the practical time-varying simulation parameter of the acceleration shown in FIG. 3, the parameters in FIG. 3 are all specific numerical values.

Here, valuing methods for the ratio N of the time length of the initial variable acceleration to the fundamental wave vibration period and the ratio $K_N$ of the total time length of starting the acceleration to the fundamental wave vibration period are both obtained according to rules obtained by a hoisting system impact restriction theory. The hoisting system impact restriction theory and the valuing methods are as follows.

a maximum value of the acceleration may be determined to be $$a_{max} = \dfrac{v}{T}\dfrac{N}{N-K_N}$$

according to the calculation formulas for the time-varying simulation parameter of the acceleration. Then, its numerical value varying along with the ratio N of the time length of the initial variable acceleration to the fundamental wave vibration period and the ratio $K_N$ of the total time length of starting the acceleration to the fundamental wave vibration period is shown in Table 1.

TABLE 1

Numerical Value Table of $\alpha_{max}$ Varying along with N and $K_N$

| | $K_N$ | | | |
|---|---|---|---|---|
| | 0.5 | 1 | 1.5 | 2 |
| $\alpha_{max}$ (N = 10) | 1.053 v/T | 1.111 v/T | 1.176 v/T | 1.25 v/T |
| $\alpha_{max}$ (N = 20) | 1.025 v/T | 1.053 v/T | 1.081 v/T | 1.111 v/T |

From Table 1, it can be seen that the maximum value of the acceleration is gradually decreased along with increase of N; and the maximum value of the acceleration is gradually increased along with increase of $K_N$, that is, impact vibration may also be reduced to a certain extent.

The hoisting ropes 4 are considered as continuous elastic bodies, and their dynamic mathematic expression is:

$$\dfrac{\partial^2 u_1}{\partial t^2} = \dfrac{EA}{P_K}\left(1+\eta_\mu\dfrac{\partial}{\partial t}\right)\dfrac{\partial^2 u_1}{\partial x^2} - a(t),$$

where $u_1$ is sectional displacement of an ascending side of the hoisting ropes 4, $\eta_\mu$ is a toughness coefficient of the ropes, a(t) is the system hoisting acceleration, E is the elastic modulus of the hoisting ropes 4, A is the sectional area of the hoisting ropes 4, and $P_K$ is the linear mass of the hoisting ropes.

The above expression is solved by adopting a separation variable method and a generalized coordinate method to obtain a solution of displacement of each section of the hoisting ropes 4, and an expression of fundamental wave influence (acceleration influence) of the hoisting ropes 4 is further deduced, i.e.:

$$A(t) = \omega_1 \int_0^t a(\tau)\sin[\omega_1(t-\tau)]d\tau,$$

where $\omega_1$ is the fundamental wave vibration frequency, and a is the acceleration system of the hoisting system.

The calculation formulas for the time-varying simulation parameter of the acceleration, i.e. the following formula:

$$a(t) = \begin{cases} \dfrac{v}{T}\dfrac{N}{N-K_N}\dfrac{t}{t_1} & (0 \leq t \leq t_1) \\ \dfrac{v}{T}\dfrac{N}{N-K_N} & (t_1 \leq t \leq t_2) \\ \dfrac{v}{T}\dfrac{N}{N-K_N}\left(1-\dfrac{t-t_2}{T-t_2}\right) & (t_2 \leq t \leq T) \end{cases}$$

and $$v(t) = \begin{cases} \dfrac{v}{T}\dfrac{N}{N-K_N}\dfrac{t^2}{2t_1} & (0 \leq t \leq t_1) \\ \dfrac{v}{T}\dfrac{N}{N-K_N}\left(\dfrac{t_1}{2}+t-t_1\right) & (t_1 \leq t \leq t_2) \\ 1-\dfrac{v}{T}\dfrac{N}{N-K_N}\dfrac{(T-t)^2}{2(T-t_2^2)} & (t_2 \leq t \leq T) \end{cases},$$

may be substituted into the expression of the fundamental wave influence (acceleration influence) of the hoisting ropes 4 to obtain an expression of the fundamental wave influence (acceleration influence) of the ropes under the time-varying simulation parameter of the acceleration, i.e.:

$$A(t) = \begin{cases} a_{max}\left(\dfrac{t}{t_1} - \dfrac{\sin\omega_1 t}{\omega_1 t_1}\right) & (0 \leq t \leq t_1) \\ a_{max}\left[1 - \dfrac{2}{\omega_1 t_1}\sin\dfrac{\omega_1 t_1}{2}\cos\omega_1\left(t-\dfrac{t_1}{2}\right)\right] & (t_1 \leq t \leq t_2) \\ a_{max}\left[1 - \dfrac{2}{\omega_1 t_1}\sin\dfrac{\omega_1 t_1}{2}\cos\omega_1\left(t-\dfrac{t_1}{2}\right)\right] - \\ \dfrac{t-t_2}{T-t_2} - \dfrac{\sin\omega_1(t-t_2)}{\omega_1(T-t_2)} & (t_2 \leq t \leq T) \end{cases}.$$

It is set $\delta=A_{max}/a_{max}$, that is, $\delta$ is a value representing a relationship between the fundamental wave influence of the hoisting ropes 4 of the hoisting system and the hoisting acceleration of the hoisting system, and may also reflect dynamic tension influence of the hoisting ropes 4. Thus it can be seen that, when $\delta=1$, it is indicated that the fundamental wave influence (acceleration influence) is equivalent to the system acceleration, that is, elastic vibration of the hoisting ropes 4 is eliminated at this moment, elastic dynamic tension of the hoisting ropes 4 is equal to rigid dynamic tension, and elastic acceleration of the hoisting ropes 4 is equal to acceleration of a hoist.

From the previous steps, it can be seen that the maximum value of the acceleration in the time-varying simulation parameter of the acceleration is $$a_{max} = \frac{v}{T}\frac{N}{N-K_N},$$

and the ratio of the time length of the initial variable acceleration to the fundamental wave vibration period is $N=t_1/T_{j1}$, where $T_{j1}$ is the fundamental wave vibration period of the hoisting ropes 4. It is set that $N=20$, and a numerical value of $\delta$ varying along with $K_N$ is shown in Table 2.

TABLE 2

Numerical Value of $\delta$ Varying along with $K_N$

| $K_N$ | 0 | 0.25 | 0.5 | 0.75 | 1 | 1.5 | 2 | 2.5 |
|---|---|---|---|---|---|---|---|---|
| $A_{max}$ | 2 | 1.924 | 1.679 | 1.35 | 1.053 | 1.31 | 1.111 | 1.288 |
| $\delta$ | 2 | 1.9 | 1.633 | 1.299 | 1 | 1.21 | 1 | 1.127 |

From Table 2, it can be seen that values of $A_{max}$ and $\delta$ are both sharply decreased along with increase of $K_N$. Such a circumstance shows that the dynamic tension of the hoisting ropes 4 is obviously reduced. When the value of $K_N$ is 1 and 2, $\delta=1$.

From the hoisting system impact restriction theory, it may be determined that a proper ratio N of a time length of initial variable acceleration to the fundamental wave vibration period and ratio $K_N$ of a total time length of starting acceleration to the fundamental wave vibration period are as follows respectively: $N=20$ and $K_N=1$.

In Step S09, a power transmission device 3 executes hoisting operation. The control unit 2 outputs the time-varying simulation parameter of the acceleration of the system to the power transmission device 3, and the power transmission device 3 starts acceleration to control hoisting of the container 5 according to the time-varying simulation parameter of the acceleration of the system.

In Step S10, the method is ended.

FIG. 3 is a curve diagram of a time-varying simulation parameter of acceleration according to an embodiment of the disclosure. The time-varying simulation parameter of the acceleration is determined through that: firstly the control unit 2 according to the fundamental wave vibration period and the preset hoisting system calculation parameter after the fundamental wave vibration period of the hoisting ropes 4 when the hoisting system is started is determined according to the load weight transmitted by the weighing unit 1 and the preset hoisting system basic parameter, wherein the preset hoisting system basic parameter includes: the self-weight of the hoisting container 5, the expected hoisting height of the hoisting system, the number of the hoisting ropes 4, the linear mass of the hoisting ropes 4, the elastic modulus of the hoisting ropes 4 and the sectional area of the hoisting ropes 4; and the preset hoisting system calculation parameter includes: the expected hoisting speed of the hoisting system, the ratio N of the time length of the initial variable acceleration to the fundamental wave vibration period and the ratio $K_N$ of the total time length of starting the acceleration to the fundamental wave vibration period, wherein the ratio N of the time length of the initial variable acceleration to the fundamental wave vibration period and the ratio $K_N$ of the total time length of starting the acceleration to the fundamental wave vibration period are both specific numerical values obtained according to the rules obtained according to the hoisting system impact restriction theory, that is, preferably, $N=20$ and $K_N=1$.

FIG. 4 is a schematic diagram of a device for preventing impact vibration of a hoisting system according to an embodiment of the disclosure. As shown in FIG. 4 and referring to FIG. 1, the device of the disclosure includes a weighing unit 1 and a control unit 2, wherein the weighing unit 1 is arranged at a bottom in a hoisting container 5 in the hoisting system, and is configured to detect load weight in the hoisting container 5 and transmit data about the detected load weight in the hoisting container to the control unit 2.

The control unit 2 is configured to determine a fundamental wave vibration period of hoisting ropes 4 when the hoisting system is started according to the load weight in the hoisting container 5 and a preset hoisting system basic parameter. Here, the preset hoisting system basic parameter includes: self-weight of the hoisting container 5, an expected hoisting height of the hoisting system, the number of the hoisting ropes 4, a linear mass of the hoisting ropes 4, an elastic modulus of the hoisting ropes 4 and a sectional area of the hoisting ropes 4.

Wherein, the control unit 2 determines the fundamental wave vibration period of the hoisting ropes 4 when the hoisting system is started according to the load weight, sent by the weighing unit 1, in the hoisting container 5 and the preset hoisting system basic parameter in the following manner:

calculating a ratio $\beta_1$ of self-weight of the ropes 4 to total load weight carried by the hoisting ropes 4 according to a formula $$\beta_1 = \frac{N_1 P_K h}{m_1 + m_2},$$

where $N_1$ is the number of the hoisting ropes 4, $P_K$ is the linear mass of the hoisting ropes 4, h is the expected hoisting height of the hoisting system, $m_1$ is the self-weight of the hoisting container 5, and $m_2$ is the load weight in the hoisting container 5;

calculating a fundamental wave vibration frequency $\omega_1$ when the hoisting system is started according to a formula $$\omega_1 = \frac{j\lambda_1}{h},$$

where $\lambda_1$ is a solution of an equation $\lambda_1 \tan \lambda_1 = \beta_1$ related to $\beta_1$, h is the expected hoisting height of the hoisting system, j is an elastic wave propagation speed of the hoisting ropes 4, and a calculation formula for j is:

$$j = \sqrt{\frac{EA}{P_K}},$$

where E is the elastic modulus of the hoisting ropes 4, A is the sectional area of the hoisting ropes 4, and $P_K$ is the linear mass of the hoisting ropes 4; and calculating the fundamental wave vibration period $T_{j1}$ according to a formula $$T_{j1} = \frac{2\pi}{\omega_1}.$$

The control unit 2 is further configured to determine a time-varying simulation parameter of acceleration of the hoisting system according to the fundamental wave vibration period and a preset hoisting system calculation parameter. Here, the preset hoisting system calculation parameter includes: an expected hoisting speed of the hoisting system, a ratio N of a time length of initial variable acceleration to the fundamental wave vibration period and a ratio $K_N$ of a total time length of starting acceleration to the fundamental wave vibration period.

Wherein, the control unit 2 determines the time-varying simulation parameter of the acceleration of the hoisting system according to the fundamental wave vibration period and the preset hoisting system calculation parameter in the following manner:

determining calculation formulas for the time-varying simulation parameter of the acceleration according to a setting to be:

$$a(t) = \begin{cases} \frac{v}{T} \frac{N}{N - K_N} \frac{t}{t_1} & (0 \le t \le t_1) \\ \frac{v}{T} \frac{N}{N - K_N} & (t_1 \le t \le t_2) \\ \frac{v}{T} \frac{N}{N - K_N} \left(1 - \frac{t - t_2}{T - t_2}\right) & (t_2 \le t \le T) \end{cases}$$

and $$v(t) = \begin{cases} \frac{v}{T} \frac{N}{N - K_N} \frac{t^2}{2t_1} & (0 \le t \le t_1) \\ \frac{v}{T} \frac{N}{N - K_N} \left(\frac{t_1}{2} + t - t_1\right) & (t_1 \le t \le t_2) \\ 1 - \frac{v}{T} \frac{N}{N - K_N} \frac{(T - t)^2}{2(T - t_2^2)} & (t_2 \le t \le T) \end{cases};$$

and determining the time-varying simulation parameter of the acceleration according to the calculation formulas and the determined ratio N of the time length of the initial variable acceleration to the fundamental wave vibration period, ratio $K_N$ of the total time length of starting the acceleration to the fundamental wave vibration period, fundamental wave vibration period $T_{j1}$ and expected hoisting speed v of the hoisting system, where v is the expected hoisting speed of the hoisting system, $[0,t_1]$ is a time interval of initial variable acceleration, $[t_2,T]$ is a time interval of last variable acceleration, $[t_1,t_2]$ is a time interval during which the acceleration is constant, T is the total time length of starting the acceleration during which a speed of the hoisting system reaches the expected hoisting speed v from 0, and $t_1 = T - t_2 = K_N T/N$, that is, the time length of the initial variable acceleration is equal to the time length of the last variable acceleration, the ratio $K_N$ of the total time length of starting the acceleration to the fundamental wave vibration period is a real number greater than 0, and a ratio $N = t_1/T_{j1}$ of the time length of the initial variable acceleration to the fundamental wave vibration period is a positive integer greater than 0.

The control unit 2 is further configured to control a power transmission device 3 of the hoisting system to hoist the hoisting container 5 according to the determined time-varying simulation parameter of the acceleration.

The device for preventing impact vibration of the hoisting system in the embodiment shown in FIG. 4 further includes a storing unit (not shown), configured to store the preset hoisting system basic parameter and the preset hoisting system calculation parameter.

In the device of the embodiment shown in FIG. 4, the ratio N of the time length of the initial variable acceleration to the fundamental wave vibration period and the ratio $K_N$ of the total time length of starting the acceleration to the fundamental wave vibration period are as follows: N=20 and $K_N=1$.

FIG. 5 is a schematic diagram of a device for preventing impact vibration of a hoisting system according to another embodiment of the disclosure. As shown in FIG. 5 and referring to FIG. 1, the device of the disclosure includes a weighing unit 1 and a control unit 2, wherein the weighing unit 1 is arranged at a connection position of a hoisting container 5 and hoisting ropes 4, and is configured to detect load weight in the hoisting container 5 and transmit data about the detected load weight in the hoisting container to the control unit 2.

The control unit 2 is configured to determine a fundamental wave vibration period of the hoisting ropes 4 when the hoisting system is started according to the load weight in the hoisting container 5 and a preset hoisting system basic parameter. Here, the preset hoisting system basic parameter includes: self-weight of the hoisting container 5, an expected hoisting height of the hoisting system, the number of the hoisting ropes 4, a linear mass of the hoisting ropes 4, an elastic modulus of the hoisting ropes 4 and a sectional area of the hoisting ropes 4.

Wherein, the control unit 2 determines the fundamental wave vibration period of the hoisting ropes 4 when the hoisting system is started according to the load weight, sent by the weighing unit 1, in the hoisting container 5 and the preset hoisting system basic parameter in the following manner:

calculating a ratio $\beta_1$ of self-weight of the hoisting ropes 4 to a total load weight carried by the hoisting ropes 4 according to a formula $$\beta_1 = \frac{N_1 P_K h}{m_1 + m_2},$$

where $N_1$ is the number of the hoisting ropes 4, $P_K$ is the linear mass of the hoisting ropes 4, h is the expected hoisting height of the hoisting system, $m_1$ is the self-weight of the hoisting container 5, and $m_2$ is the load weight in the hoisting container 5;

calculating a fundamental wave vibration frequency $\omega_1$ when the hoisting system is started according to a formula $$\omega_1 = \frac{j\lambda_1}{h},$$

where $\lambda_1$ is a solution of an equation $\lambda_1 \tan \lambda_1 = \beta_1$ related to $\beta_1$, h is the expected hoisting height of the hoisting system, j is an elastic wave propagation speed of the hoisting ropes 4, and a calculation formula for j is:

$$j = \sqrt{\frac{EA}{P_K}},$$

where E is the elastic modulus of the hoisting ropes 4, A is the sectional area of the hoisting ropes 4, and $P_K$ is the linear mass of the hoisting ropes 4; and calculating the fundamental wave vibration period $T_{j1}$ according to a formula $$T_{j1} = \frac{2\pi}{\omega_1}.$$

The control unit 2 is further configured to determine a time-varying simulation parameter of acceleration of the hoisting system according to the fundamental wave vibration period and a preset hoisting system calculation parameter. Here, the preset hoisting system calculation parameter includes: an expected hoisting speed of the hoisting system, a ratio N of a time length of initial variable acceleration to the fundamental wave vibration period and a ratio $K_N$ of a total time length of starting acceleration to the fundamental wave vibration period.

Wherein, the control unit 2 determines the time-varying simulation parameter of the acceleration of the hoisting system according to the fundamental wave vibration period and the preset hoisting system calculation parameter in the following manner:

determining calculation formulas for the time-varying simulation parameter of the acceleration according to a setting to be:

$$a(t) = \begin{cases} \frac{v}{T} \frac{N}{N-K_N} \frac{t}{t_1} & (0 \le t \le t_1) \\ \frac{v}{T} \frac{N}{N-K_N} & (t_1 \le t \le t_2) \text{ and} \\ \frac{v}{T} \frac{N}{N-K_N}\left(1 - \frac{t-t_2}{T-t_2}\right) & (t_2 \le t \le T) \end{cases}$$

$$v(t) = \begin{cases} \frac{v}{T} \frac{N}{N-K_N} \frac{t^2}{2t_1} & (0 \le t \le t_1) \\ \frac{v}{T} \frac{N}{N-K_N}\left(\frac{t_1}{2} + t - t_1\right) & (t_1 \le t \le t_2); \\ 1 - \frac{v}{T} \frac{N}{N-K_N} \frac{(T-t)^2}{2(T-t_2^2)} & (t_2 \le t \le T) \end{cases}$$

and determining the time-varying simulation parameter of the acceleration according to the calculation formula and the determined ratio N of the time length of the initial variable acceleration to the fundamental wave vibration period, ratio $K_N$ of the total time length of starting acceleration to the fundamental wave vibration period, the fundamental wave vibration period $T_{j1}$ and the expected hoisting speed v of the hoisting system, where v is the expected hoisting speed of the hoisting system, $[0,t_1]$ is a time interval of initial variable acceleration, $[t_2,T]$ is a time interval of last variable acceleration, $[t_1,t_2]$ is a time interval during which the acceleration is constant, T is the total time length of starting acceleration during which a speed of the hoisting system reaches the expected hoisting speed v from 0, and $t_1=T-t_2=K_N T/N$, that is, the time length of the initial variable acceleration is equal to the time length of the last variable acceleration, the ratio $K_N$ of the total time length of starting acceleration to the fundamental wave vibration period is a real number greater than 0, and a ratio $N=t_1/T_{j1}$ of the time length of the initial variable acceleration to the fundamental wave vibration period is a positive integer greater than 0.

The control unit 2 is further configured to control a power transmission device 3 of the hoisting system to hoist the hoisting container 5 according to the determined time-varying simulation parameter of the acceleration.

The device for preventing impact vibration of the hoisting system in the embodiment shown in FIG. 5 further includes a storing unit (not shown), configured to store the preset hoisting system basic parameter and the preset hoisting system calculation parameter.

In the device of the embodiment shown in FIG. 5, the ratio N of the time length of the initial variable acceleration to the fundamental wave vibration period and the ratio $K_N$ of the total time length of starting acceleration to the fundamental wave vibration period are as follows: N=20 and $K_N$=1.

The invention claimed is:

1. A method for preventing impact vibration of a hoisting system, comprising:
   acquiring load weight in a hoisting container; acquiring a preset hoisting system basic parameter;
   determining a fundamental wave vibration period of hoisting ropes when the hoisting system is started according to the load weight in the hoisting container and the preset hoisting system basic parameter;
   acquiring a preset hoisting system calculation parameter;
   determining a time-varying simulation parameter of acceleration of the hoisting system in a process of hoisting according to the fundamental wave vibration period and the preset hoisting system calculation parameter; and
   hoisting the hoisting container according to the determined time-varying simulation parameter of the acceleration,
   wherein the preset hoisting system basic parameter comprises: self-weight of the hoisting container, an expected hoisting height of the hoisting system, the number of the hoisting ropes, a linear mass of the hoisting ropes, an elastic modulus of the hoisting ropes and a sectional area of the hoisting ropes,
   wherein determining the fundamental wave vibration period of the hoisting ropes when the hoisting system is started through the acquired load weight in the hoisting container and the preset hoisting system basic parameter comprises:
   calculating a ratio $\beta_1$ of self-weight of the ropes to a total load weight carried by the hoisting ropes according to a formula $$\beta_1 = \frac{N_1 P_K h}{m_1 + m_2},$$

where $N_1$ is the number of the hoisting ropes, $P_K$ is the linear mass of the hoisting ropes, h is the expected hoisting height of the hoisting system, $m_1$ is self-weight of the hoisting container, and $m_2$ is the load weight in the hoisting container;

calculating a fundamental wave vibration frequency $\omega_1$ when the hoisting system is started according to a formula $$\omega_1 = \frac{j\lambda_1}{h},$$

where $\lambda_1$ is a solution of an equation $\lambda_1 \tan \lambda_1 = \beta_2$ related to $\beta_1$, h is the expected hoisting height of the hoisting system, j is an elastic wave propagation speed of the hoisting ropes, and a calculation formula for j is:

$$j = \sqrt{\frac{EA}{P_K}},$$

where E is the elastic modulus of the hoisting ropes, A is the sectional area of the hoisting ropes, and $P_K$ is the linear mass of the hoisting ropes; and calculating the fundamental wave vibration period $T_{j1}$ according to a formula $$T_{j1} = \frac{2\pi}{\omega_1}.$$

2. The method according to claim 1, wherein the preset hoisting system calculation parameter comprises: an expected hoisting speed of the hoisting system, a ratio N of a time length of initial variable acceleration to the fundamental wave vibration period, and a ratio $K_N$ of a total time length of starting acceleration to the fundamental wave vibration period.

3. The method according to claim 2, wherein the ratio N of the time length of the initial variable acceleration to the fundamental wave vibration period and the ratio $K_N$ of the total time length of starting the acceleration to the fundamental wave vibration period are as follows: N=20 and $K_N$=1.

4. The method according to claim 2, wherein determining the time-varying simulation parameter of the acceleration of the hoisting system through the fundamental wave vibration period and the preset hoisting system calculation parameter comprises:

determining calculation formulas for the time-varying simulation parameter of starting the acceleration according to a setting to be:

$$a(t) = \begin{cases} \dfrac{v}{T} \dfrac{N}{N - K_N} \dfrac{t}{t_1} & (0 \leq t \leq t_1) \\ \dfrac{v}{T} \dfrac{N}{N - K_N} & (t_1 \leq t \leq t_2) \text{ and} \\ \dfrac{v}{T} \dfrac{N}{N - K_N}\left(1 - \dfrac{t - t_2}{T - t_2}\right) & (t_2 \leq t \leq T) \end{cases}$$

$$v(t) = \begin{cases} \dfrac{v}{T} \dfrac{N}{N - K_N} \dfrac{t^2}{2t_1} & (0 \leq t \leq t_1) \\ \dfrac{v}{T} \dfrac{N}{N - K_N}\left(\dfrac{t_1}{2} + t - t_1\right) & (t_1 \leq t \leq t_2); \\ 1 - \dfrac{v}{T} \dfrac{N}{N - K_N} \dfrac{(T-t)^2}{2(T - t_2^2)} & (t_2 \leq t \leq T) \end{cases}$$

and determining the time-varying simulation parameter of the acceleration according to the calculation formulas and the determined ratio N of the time length of the initial variable acceleration to the fundamental wave vibration period, the ratio $K_N$ of the total time length of starting the acceleration to the fundamental wave vibration period, the fundamental wave vibration period $T_{j1}$ and the expected hoisting speed v of the hoisting system, where v is the expected hoisting speed of the hoisting system, [0, $t_1$] is a time interval of the initial variable acceleration, [$t_2$, T] is a time interval of last variable acceleration, [$t_1$, $t_2$] is a time interval during which the acceleration is constant, T is the total time length of starting the acceleration during which a speed of the hoisting system reaches the expected hoisting speed v from 0, and $t_1 = T - t_2 = K_N T/N$, that is, the time length of the initial variable acceleration is equal to the time length of the last variable acceleration, the ratio $K_N$ of the total time length of starting the acceleration to the fundamental wave vibration period is a real number greater than 0, and the ratio $N = t_1/T_{j1}$ of the time length of the initial variable acceleration to the fundamental wave vibration period is a positive integer greater than 0.

5. A device for preventing impact vibration of a hoisting system, comprising: a weighing unit and a control unit, wherein the weighing unit is configured to detect load weight in a hoisting container, and transmit data about the detected load weight in the hoisting container to the control unit; and the control unit is configured to determine a fundamental wave vibration period of hoisting ropes when the hoisting system is started according to the load weight in the hoisting container and a preset hoisting system basic parameter, determine a time-varying simulation parameter of acceleration of the hoisting system according to the fundamental wave vibration period and a preset hoisting system calculation parameter, and control a power transmission device of the hoisting system to hoist the hoisting container according to the determined time-varying simulation parameter of the acceleration, wherein the preset hoisting system basic parameter comprises: self-weight of the hoisting container, an expected hoisting height of the hoisting system, the number of the hoisting ropes, a linear mass of the hoisting ropes, an elastic modulus of the hoisting ropes and a sectional area of the hoisting ropes, wherein the control unit is configured to determine the fundamental wave vibration period of the hoisting ropes when the hoisting system is started in the following manner:

calculating a ratio $\beta_1$ of self-weight of the ropes to total load weight carried by the hoisting ropes according to a formula $$\beta_1 = \frac{N_1 P_K h}{m_1 + m_2},$$

where $N_1$ is the number of the hoisting ropes, $P_K$ is the linear mass of the hoisting ropes, h is the expected hoisting height of the hoisting system, $m_1$ is the self-weight of the hoisting container, and $m_2$ is the load weight in the hoisting container;

calculating a fundamental wave vibration frequency $\omega_1$ when the hoisting system is started according to a formula $$\omega_1 = \frac{j\lambda_1}{h},$$

where $\lambda_1$ is a solution of an equation $\lambda_1 \tan \lambda_1 = \beta_1$ related to $\beta_1$, h is the expected hoisting height of the hoisting system, j is an elastic wave propagation speed of the hoisting ropes, and a calculation formula for j is:

$$j = \sqrt{\frac{EA}{P_K}},$$

where E is the elastic modulus of the hoisting ropes, A is the sectional area of the hoisting ropes, and $P_K$ is the linear mass of the hoisting ropes; and calculating the fundamental wave vibration period $T_{j1}$ according to a formula $$T_{j1} = \frac{2\pi}{\omega_1}.$$

6. The device according to claim 5, further comprising: a storage unit, configured to store the preset hoisting system basic parameter and the preset hoisting system calculation parameter.

7. The device according to claim 5, wherein the preset hoisting system calculation parameter comprises: an expected hoisting speed of the hoisting system, a ratio N of a time length of initial variable acceleration to the fundamental wave vibration period and a ratio $K_N$ of a total time length of starting acceleration to the fundamental wave vibration period.

8. The device according to claim 7, wherein the ratio N of the time length of the initial variable acceleration to the fundamental wave vibration period and the ratio $K_N$ of the total time length of starting the acceleration to the fundamental wave vibration period are as follows: N=20 and $K_N$=1.

9. The device according to claim 7, wherein the control unit is further configured to determine the time-varying simulation parameter of the acceleration of the hoisting system in the following manner:

determining calculation formulas for the time-varying simulation parameter of starting the acceleration according to a setting to be:

$$a(t) = \begin{cases} \dfrac{v}{T}\dfrac{N}{N-K_N}\dfrac{t}{t_1} & (0 \le t \le t_1) \\ \dfrac{v}{T}\dfrac{N}{N-K_N} & (t_1 \le t \le t_2) \text{ and} \\ \dfrac{v}{T}\dfrac{N}{N-K_N}\left(1 - \dfrac{t-t_2}{T-t_2}\right) & (t_2 \le t \le T) \end{cases}$$

$$v(t) = \begin{cases} \dfrac{v}{T}\dfrac{N}{N-K_N}\dfrac{t^2}{2t_1} & (0 \le t \le t_1) \\ \dfrac{v}{T}\dfrac{N}{N-K_N}\left(\dfrac{t_1}{2} + t - t_1\right) & (t_1 \le t \le t_2); \\ 1 - \dfrac{v}{T}\dfrac{N}{N-K_N}\dfrac{(T-t)^2}{2(T-t_2^2)} & (t_2 \le t \le T) \end{cases}$$

and determining the time-varying simulation parameter of the acceleration according to the calculation formulas and the determined ratio N of the time length of the initial variable acceleration to the fundamental wave vibration period, the ratio $K_N$ of the total time length of starting the acceleration to the fundamental wave vibration period, the fundamental wave vibration period $T_{j1}$ and the expected hoisting speed v of the hoisting system, where v is the expected hoisting speed of the hoisting system, [0, $t_1$] is a time interval of the initial variable acceleration, [$t_2$, T] is a time interval of last variable acceleration, [$t_1$, $t_2$] is a time interval during which the acceleration is constant, T is the total time length of starting the acceleration during which a speed of the hoisting system reaches the expected hoisting speed v from 0, and $t_1 = T - t_2 = K_N T/N$, that is, the time length of the initial variable acceleration is equal to the time length of the last variable acceleration, the ratio KN of the total time length of starting the acceleration to the fundamental wave vibration period is a real number greater than 0, and a ratio $N = t_1/T_{j1}$ of the time length of the initial variable acceleration to the fundamental wave vibration period is a positive integer greater than 0.

* * * * *